United States Patent
Ferrari et al.

(10) Patent No.: US 6,949,055 B2
(45) Date of Patent: Sep. 27, 2005

(54) MACHINE TOOL

(75) Inventors: Maurizio Ferrari, Pizzighettone (IT); Carlo Massari, San Giorgio (IT)

(73) Assignee: JOBS S.p.A., Piacenza (IT)

(*) Notice: Subject to any disclaimer, the term of this patent is extended or adjusted under 35 U.S.C. 154(b) by 37 days.

(21) Appl. No.: 10/773,141

(22) Filed: Feb. 9, 2004

(65) Prior Publication Data

US 2004/0162201 A1 Aug. 19, 2004

(30) Foreign Application Priority Data

Feb. 19, 2003 (IT) .................................. BO2003A0071

(51) Int. Cl.⁷ ........................... B23Q 3/157; B23C 1/06
(52) U.S. Cl. .............................. 483/6; 483/40; 483/44; 483/46; 483/48; 483/52; 409/202
(58) Field of Search .......................... 483/4–11, 30–32, 483/34–36, 38–40, 44–46, 48–49, 51–53; 409/202, 212

(56) References Cited

U.S. PATENT DOCUMENTS

| | | | |
|---|---|---|---|
| 4,635,342 A | | 1/1987 | Balding |
| 4,683,638 A | * | 8/1987 | Winkler et al. ............... 483/49 |
| 4,987,668 A | * | 1/1991 | Roesch ........................ 483/30 |
| 5,107,581 A | * | 4/1992 | Reuter et al. ................. 483/61 |
| 5,314,397 A | * | 5/1994 | Mills et al. ................... 483/30 |
| 6,068,431 A | * | 5/2000 | Line ........................... 409/202 |
| 6,099,448 A | * | 8/2000 | Sun ............................. 483/31 |
| 6,464,623 B1 | * | 10/2002 | Laur et al. .................... 483/41 |
| 2002/0107122 A1 | | 8/2002 | Hoppe |

FOREIGN PATENT DOCUMENTS

| | | |
|---|---|---|
| DE | 19851264 | 5/2000 |
| EP | 255736 A1 * | 2/1988 |
| FR | 2668730 A1 * | 5/1992 |

OTHER PUBLICATIONS

European Search Report dated Jun. 2, 2004.

\* cited by examiner

*Primary Examiner*—Erica Cadugan
(74) *Attorney, Agent, or Firm*—Harbin King & Klima

(57) ABSTRACT

A machine tool consists in a pair of slide ways set apart one from another and extending parallel with a longitudinal axis, a machining station between the slide ways, presenting a first zone and a second zone adjacent one to the other, and a traveling gantry set in motion along the slide ways and carrying a machining head positionable in the first and second zones. Installed alongside at least one of the slide ways and containing a supply of tools attachable to the machining head is a magazine equipped with a first changer element positioned to coincide with the first zone of the station, and a second changer element positioned to coincide with the second zone, so that whichever of the two zones the machining head happens to occupy at any given moment, the tool currently in use can be replaced with a tool from the magazine by the relative changer element with minimal loss of time.

20 Claims, 5 Drawing Sheets

MACHINE TOOL

BACKGROUND OF THE INVENTION

The present invention relates to a machine tool.

In particular, the present invention relates to a high/ultra-high speed machine tool for operations such as milling and drilling parts of notably large dimensions.

Machine tools of the type in question present a bridge-like structure commonly referred to as a gantry, and find application to advantage in the preparation of models or moulds for motor vehicles, by way of example, or in the fabrication of wings for aircraft, and such like.

More exactly, the prior art embraces machine tools furnished with two longitudinal and parallel slide ways supporting a gantry able to travel along a path parallel to the longitudinal axis of the selfsame slide ways.

The slide ways are normally spaced apart in such a manner that the space between them will serve as a machining station in which to position the work. The traveling gantry is composed of two upright members, each slidably associated with a respective way, whilst the uprights in turn are surmounted by a horizontal cross member or beam traversable over the machining station and carrying a machining head equippable with a corresponding tool for the type of work or part in process.

Generally speaking, the machining head is able to travel along the beam in a direction transverse to the direction of movement of the gantry. Moreover, the head can be raised from and lowered toward the machining station and is rotatable about two axes, the one vertical and the other transverse to the longitudinal axis of the slide ways, allowing the tool to be set at a given angle. The tool itself is also rotatable about a respective longitudinal axis in order to mill or drill the part.

Thus, the machining head is capable of movement referable to five axes: a longitudinal first axis extending parallel to the axis of the slide ways (movement of the gantry uprights along the slide ways); a second axis transverse to the longitudinal axis of the ways (movement of the machining head along the beam); a vertical third axis (movement of the head toward/away from the machining station); a vertical fourth axis of rotation (rotary movement of the head); and a fifth axis of rotation normal to the vertical fourth axis (pivoting movement of the head).

The part is positioned in the machining station, and the machining head maneuvered by the gantry in such a way as to engage the specified areas of the part.

In addition, the machining station is divided by a bulkhead establishing a first zone and a second zone. With this dual-zone arrangement, machining operations can be carried out on two different parts, each occupying one of the aforementioned zones.

When carrying out operations on aircraft wings, for example, each wing is placed in a corresponding zone and the gantry then made to position the head over the two zones in alternation so that identical operations can be performed symmetrically on the two wings.

Also embraced by the prior art are machine tools presenting slide ways mounted to respective side walls, and equipped with a tool magazine positioned alongside one of the side walls.

The magazine appears as a chamber internally of which to accommodate a plurality of tools, each one designed to perform a particular operation.

The magazine is also connected to the machining station by way of a mechanical changer arm. More exactly, the arm is positioned to coincide with an opening in the relative side wall, placed to allow communication between the machining station and the chamber of the magazine.

With this type of arrangement, the tools held by the machining head can be changed automatically. In particular, whenever a tool currently in use needs to be changed, the gantry is directed to a point alongside the aforementioned opening, whereupon the changer arm will grip and remove the tool from the head and return it to the magazine. Thereafter, a new tool is taken by the changer from the magazine and offered to the machining head.

The magazine can also be equipped with a gripper device capable of movement within the chamber, such as will select and lay hold on a tool and position it on the changer arm.

In this way, the steps of selecting and changing tools can be fully automated.

Nonetheless, a machine tool of the conventional type thus outlined presents a drawback connected with the tool change operations.

In effect, it will be observed that the opening and therefore the mechanical changer arm are placed in one of the two zones of the machining station. Accordingly, when the machining head happens to be operating in the zone opposite to that occupied by the changer arm, the gantry must travel from one zone to the other in order to make the change.

As a result, machining times are prolonged due to the continuous movements of the gantry required in order to carry out tool changes. These machining times will be even longer if the distance between the tool change opening and the zone currently occupied by the machining head is especially great.

A further drawback with the arrangement described is that it prevents an operator from entering and attending to a part occupying the first zone, for example, even when the gantry is positioned over a part occupying the second zone.

This drawback derives, similarly, from the fact that the gantry has to travel continually between the first and second zones in order to carry out machining and tool change operations. In practice, therefore, the operator cannot rely on sufficiently safe working conditions in which to work on a part, since even if no machining operations are taking place in the relative zone at any given moment, the gantry may still travel into this idle zone.

There are also prior art machine tools in which these drawbacks are overcome by duplicating all of the components involved in tool change operations. More exactly, such machines have: two magazines, each one positioned alongside a relative zone; two openings afforded by a relative side wall, allowing each magazine to communicate with the corresponding zone; and two mechanical changer arms, one for each magazine.

In this solution, all the machining tools held in the magazines are likewise duplicated.

The gantry can therefore machine and change tools while remaining in the same zone, without having to travel continually, and the adjacent zone is left free for manual operations if need be.

It will be appreciated that this solution, while not affected by the problems mentioned previously, presents a major drawback of structural complexity attributable to the inclusion of two magazines.

Moreover, this solution is penalized by an unduly high cost of implementation, again attributable to the fact that all components involved in the tool change operation are duplicated.

The object of the present invention is to provide a machine tool unaffected by the aforementioned drawbacks.

One object of the invention, in particular, is to set forth a machine tool equipped with tool change components that are accessible from both zones of the machining station.

A further object of the invention is to provide an economical machine tool with a simple structure.

SUMMARY OF THE INVENTION

The stated objects are realized according to the present invention in a machine tool comprising at least one pair of slide ways, set apart one from another and extending parallel with a predominating longitudinal axis, a machining station delimited laterally by the slide ways and presenting a first zone and a second zone adjacent one to the other, also a traveling gantry mounted to the slide ways and carrying a machining head positioned above the machining station, capable of movement along the ways in such a way that the head can be positioned in the first and second zones. Also associated with the machine is a magazine placed alongside at least one of the slide ways and containing a plurality of tools attachable to the machining head.

The magazine is equipped with a first changer element positioned to coincide with the respective first zone of the station, and a second changer element positioned to coincide with the respective second zone; each changer element is capable of movement between a first operating position in which it occupies the magazine for the purpose of selecting at least one tool, and a second position in which it occupies the machining station for the purpose of fitting the tool to the machining head.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
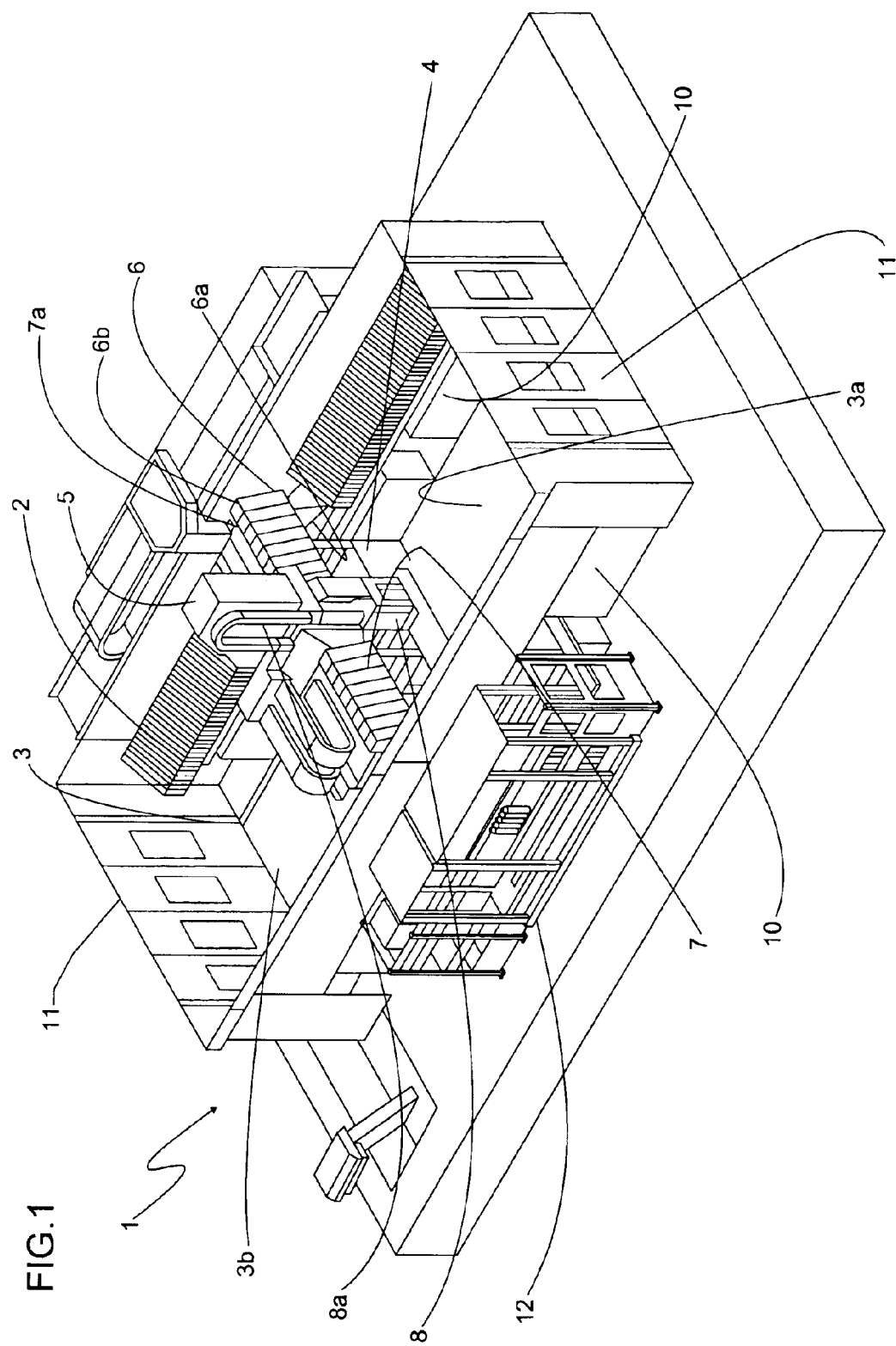
FIG. 1 illustrates a machine tool according to the present invention, viewed schematically and in perspective with certain parts omitted for clarity.

With reference to FIG. 1 of the accompanying drawings, 1 denotes the machine tool according to the invention, in its entirety.

The machine 1 presents at least one pair of slide ways 2, consisting in tracks or elements equivalent in terms of the art, set apart one from the other and extending parallel with a longitudinal axis A.

The space between the slide ways 2 accommodates a machining station 3 in which to position a part.

In a preferred solution, the machining station 3 will be of appreciable dimensions. In effect, the machine tool 1 according to the present invention finds application to advantage in the machining of considerably large items. Reference is made by way of example, albeit implying no limitation in scope, to items such as moulds and external profiles for automobiles, aircraft fuselage components, and structural parts of aircraft wings.

Figure 2:
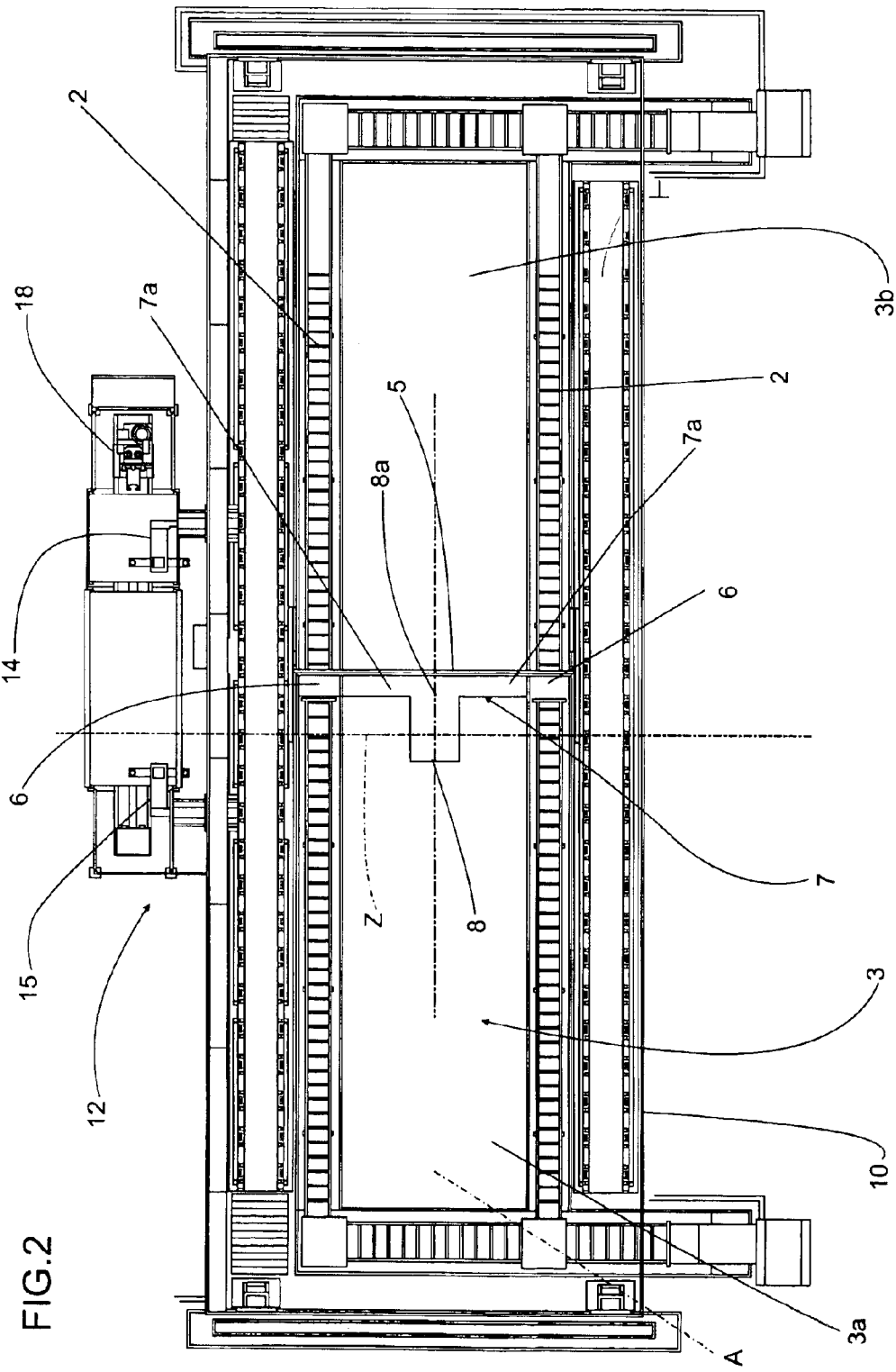
FIG. 2 is a plan view showing the machine of FIG. 1, with certain parts omitted for clarity.

To advantage, as illustrated in the plan view of FIG. 2, the machining station 3 is made up of a first zone 3a and a second zone 3b adjacent one to another. The two zones 3a and 3b in question are divided by a bulkhead 4 extending from one slide way 2 to the other, transverse to the longitudinal axis A. Preferably, the bulkhead 4 will be equipped with suitable drive systems of conventional type, neither described nor illustrated, by which the bulkhead 4 itself can be displaced along the length of the station 3 so as to establish the size of the two zones 3a and 3b. For the sake of simplicity, the bulkhead 4 is illustrated occupying a position substantially half way along the station 3, so that the separated zones 3a and 3b are of equal size.

The machine 1 further comprises a traveling gantry 5 mounted to and capable of movement along the two slide ways 2 between the first and second zones 3a and 3b.

The gantry 5 is composed of two uprights 6, each presenting a first end 6a slidably associated (by way of conventional means not described further in the specification) with one of the ways 2, and a second end 6b opposite from the first end 6a.

The second ends 6b of the two uprights 6 carry a beam 7 disposed transversely to the longitudinal axis A. More exactly, the beam 7 occupies a plane above the bulkhead 4 and is associated by way of its two opposite ends 7a with the second ends 6b of the two uprights 6.

Associated with the underside of the beam 7, and directed down toward the machining station 3, is a machining head 8. The head 8 is associated with the beam 7 by way of a relative drive unit 8a capable of movement along the beam 7 in a direction X transverse to the longitudinal axis A, in such a way that the head 8 itself can be traversed along the selfsame direction X.

In a preferred embodiment, the machining head 8 will consist in a spindlehead to which a tool 9 such as a drill bit or a milling cutter can be attached. The head 8 is also traversable vertically toward and away from the machining station 3, as well as being rotatable about a first vertical axis Y and pivotable about a second axis Z parallel to the transverse direction X. The head 8 thus has freedom of movement along and/or about five distinct axes in such a way that it can be positioned freely at any given point and assume any given angle within and relative to the work envelope of the machining station 3.

It will be appreciated that the drive unit 8a, by which the machining head 8 is carried and invested with linear and/or angular motion referable to four axes (linear motion along transverse axis X and vertical Y axis, rotation about vertical axis Y and transverse axis Z), is a mechanical device familiar to a person skilled in the art, and therefore not described further or illustrated in any detail.

The machine 1 further comprises two side walls 10 extending parallel one with another and delimiting the machining station 3 on either side.

In particular, each side wall 10 is located under a relative slide way 2 and extends the full length of the selfsame way 2. Advantageously, as shown in FIG. 1, the machine can be equipped with two sets of sliding doors 11 associated with the ends of the side walls 10 in such a way as to form an enclosure around the machining station 3.

Externally of the machining station 3, and more exactly along one side wall 10, the machine 1 is flanked by a magazine 12 containing a plurality of tools 9 attachable to the head 8.

More exactly, the magazine 12 communicates with the machining station 3 by way of two openings 13 fashioned in the side wall 10 associated with the magazine 12. Each opening 13 is placed to coincide with a respective zone 3a and 3b of the station 3.

The machine 1 disclosed is also equipped with a first changer element 14 positioned alongside the respective first zone 3a of the station 3, and a second changer element 15 positioned alongside the respective second zone 3b. Each changer element 14 and 15 is capable of movement by way of a relative opening 13 between a first operating position in the magazine 12, allowing the selection of at least one tool 9, and a second position in the machining station 3 allowing the tool 9 to be offered to the machining head 8.

Figure 3:
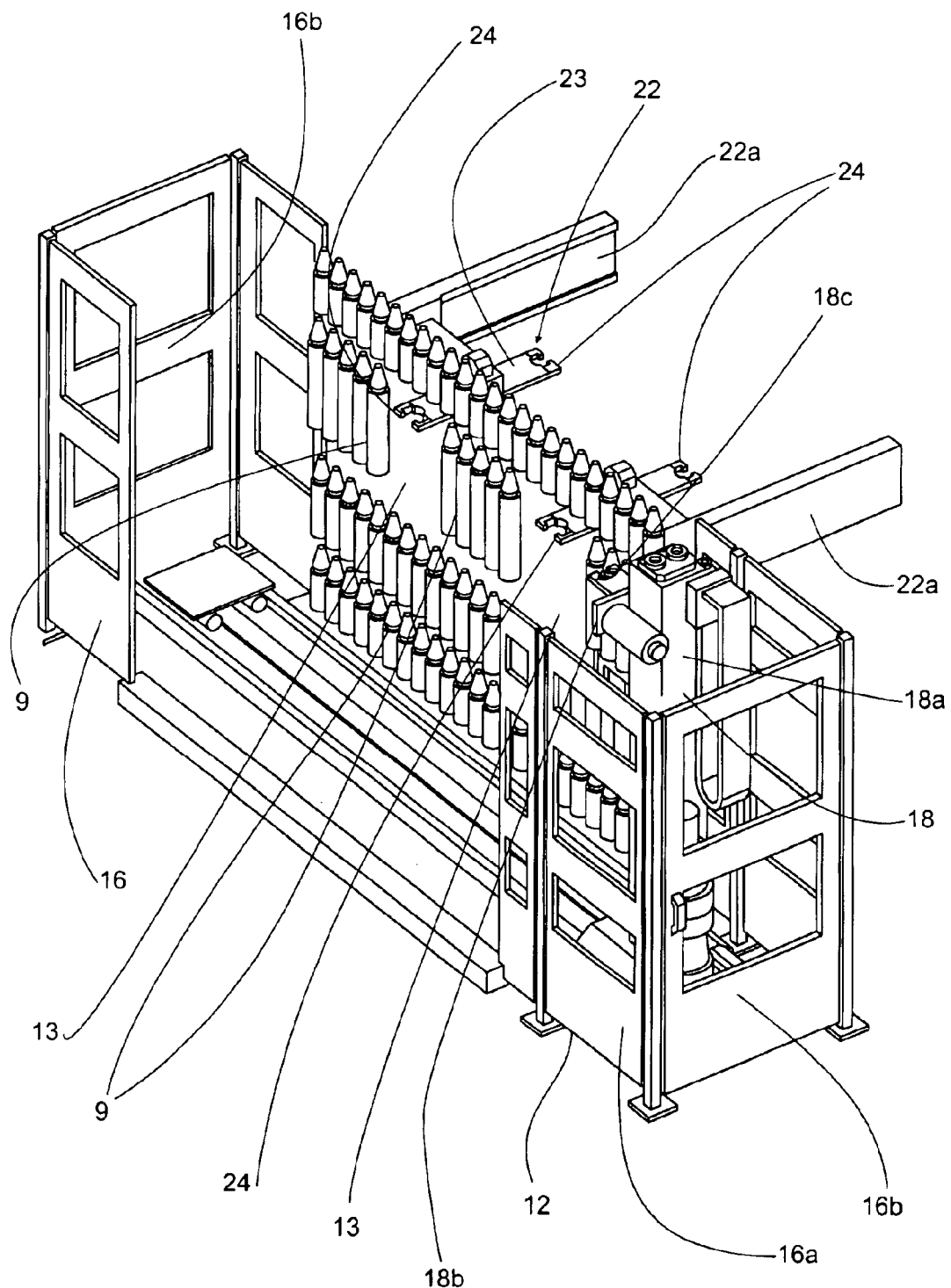
FIG. 3 shows a constructional detail of the machine, viewed in perspective.
Figure 4:
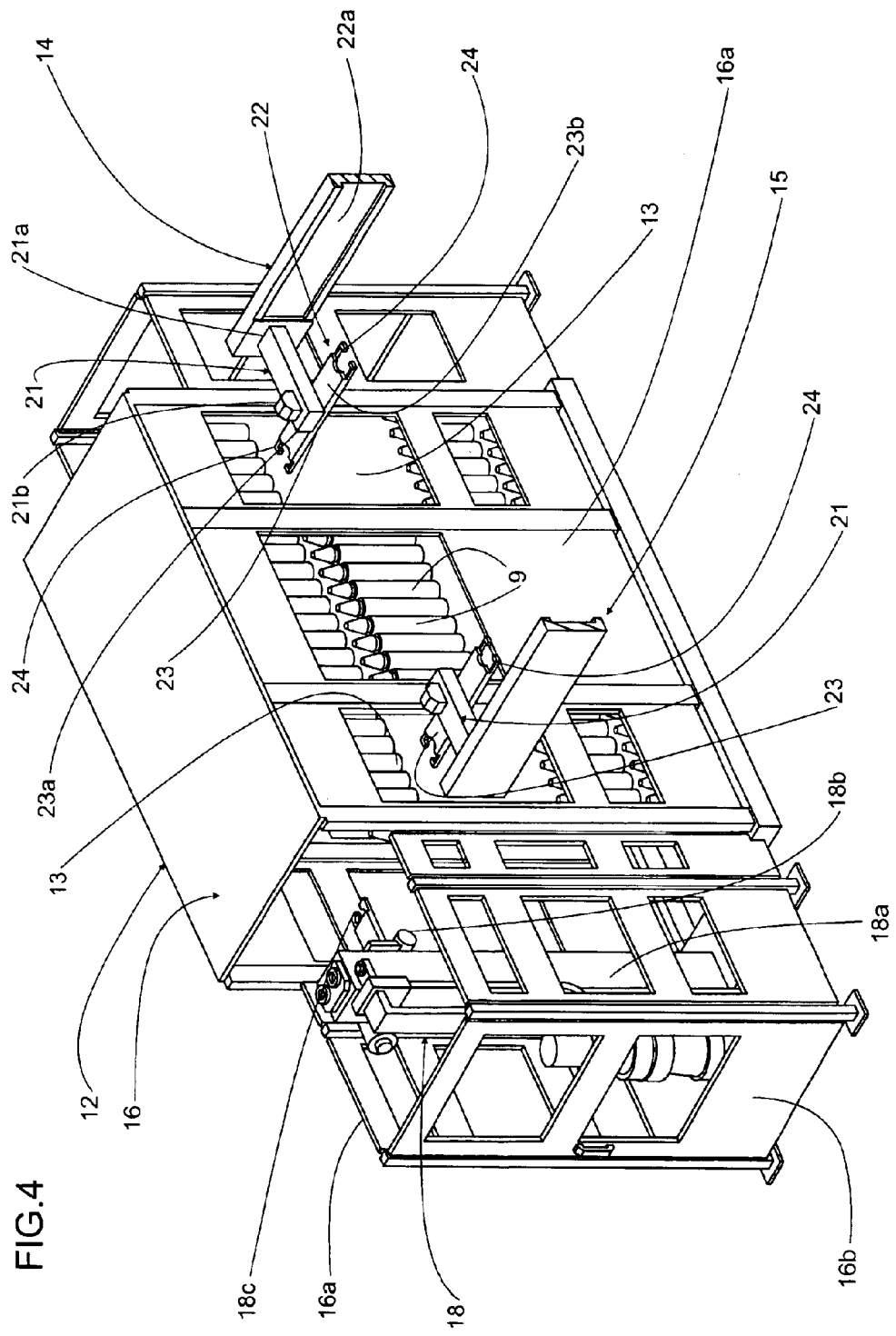
FIG. 4 shows the same constructional detail as in FIG. 3, viewed in perspective and from the side opposite.

More precisely, and as illustrated in detail in FIG. 3 and FIG. 4, the magazine 12 appears as a chamber 16 presenting larger longitudinal walls 16a and smaller end walls 16b.

The inside of the chamber 16 affords a plurality of horizontal and parallel supports 17 attached to the larger longitudinal walls 16a. Advantageously, the supports 17 consist in a set of shelves serving to hold the aforementioned tools 9 when not in use.

The magazine 12 further comprises a selector device 18 capable of movement longitudinally along the length of the chamber 16, in such a way as to allow of picking a tool 9 and positioning it on the changer elements 14 and 15 when these are in the first operating position.

In a preferred embodiment, the selector device 18 will appear as a substantially vertical column 18a slidable along special ways extending parallel to the horizontal shelves 17.

The selector device 18 also comprises a slide 18b associated with and traversable vertically along the length of the column 18a, and furnished with a gripper assembly 18c by means of which to lay hold on the tools 9.

More particularly, the gripper assembly 18c will be a mechanical gripper of familiar type capable of seizing and releasing the tool 9. The drive units by which the slide 18b is set in motion along the column 18a and the column 18a itself along the ways will be familiar to a person skilled in the art, as will the mechanism of the gripper assembly 18c, and accordingly, these are not described further.

With this arrangement, the slide 18b is rendered capable of movement between a first position of alignment with the horizontal shelves 17, in which a tool 9 can be picked, and a second position of proximity to the first or second changer element 14 or 15 in which a tool 9 can be transferred to the selfsame changer element 14 or 15.

Figure 5:
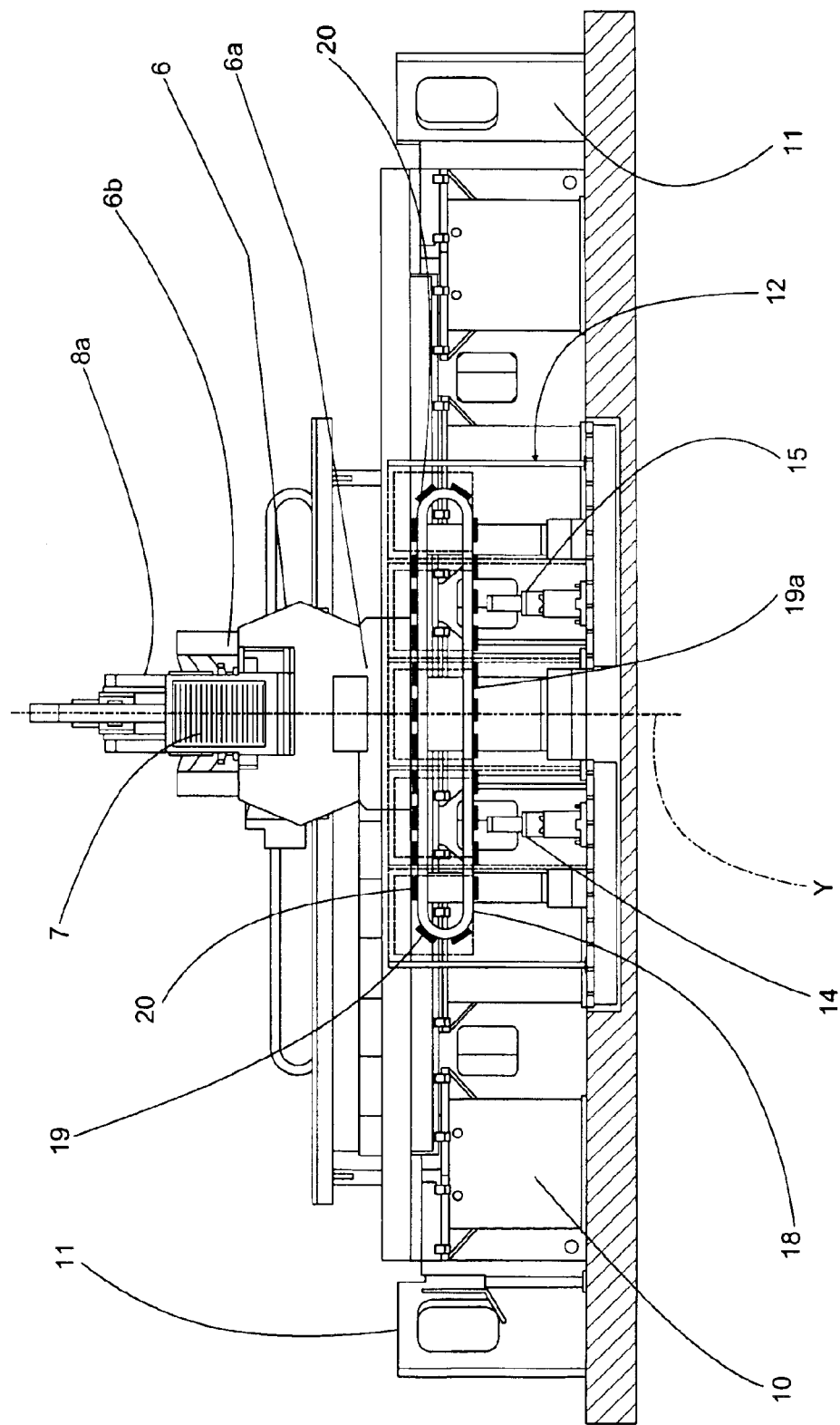
FIG. 5 illustrates the machine of FIG. 1, viewed in a side elevation and shown in a second embodiment.

Alternatively, as illustrated in FIG. 5, the selector device 18 could be embodied as a looped belt 19 describing a substantially elliptical path that includes a rectilinear branch 19a passing in close proximity to the first and second changer elements 14 and 15.

In this second solution, the belt 19 presents a plurality of carrier portions 20 ordered along the developable length of the loop, on which to support the single tools 9.

The carrier portions 20 are capable of movement between a first position in which a selected tool 9 is held in alignment with the belt 19, and a second position, assumed along the rectilinear branch 19a, in which the tool 9 is offered to the first or the second changer element 14 or 15.

Referring in more detail to the structure of each changer element 14 and 15, this comprises a fixed support 21 of substantially elongated appearance, of which a first end 21a is associated with the side wall 10 next to the magazine 12, and a second end 21b opposite to the first end 21a is aligned with the relative opening 13.

As illustrated to best advantage in FIG. 4, the fixed support 21 engages slidably with a track 22a interconnecting the magazine 12 and the relative side wall 10. In this particular instance the fixed support 21 is anchored to the track 22a by way of the first end 21a, projecting perpendicularly, and slidable thus along the selfsame track 22a.

Alternatively, the fixed support 21 might equally well be rigidly associated with the side wall 10 in such a way that the second end 21b is positioned permanently at the center of the opening 13.

Each changer element 14 and 15 also presents a movable portion 22 pivotably associated with the second end 21b of the fixed support 21.

More exactly, the movable portion 22 consists in an arm 23 of elongated appearance, of which the two opposite ends 23a and 23b present relative gripper elements 24 each able to hold a respective tool 9.

As in the case of the gripper assemblies 18c mentioned previously, likewise in this instance the gripper elements 24 will consist substantially in mechanical grippers of conventional type.

The aforementioned arm 23 is rotatable about a respective substantially vertical axis between a first position corresponding to the first position assumed by the changer element 14 or 15, in which a tool 9 is taken up from the magazine 12 by one of the gripper elements 24, and a second position corresponding to the second position assumed by the changer element 14 or 15, in which the tool 9 is offered by the gripper element 24 to the machining head 8.

In effect, the arm 23 is rotatable through 180° so that the respective ends 23a and 23b can be directed toward the magazine 12 or the machining station 3 according to the operation in hand.

In operation, two parts for machining are placed in the respective zones 3a and 3b of the station 3; in the case of aircraft wings, for example, one wing in each zone 3a and 3b.

Thereupon, the traveling gantry 5 is positioned over one of the zones 3a or 3b, for example the first zone 3a, in readiness to begin machining.

In the event of the head 8 having to perform an operation different to that performed previously, the tool 9 must be changed. In this situation, the gantry 5 moves to a point alongside the opening 13 serving the first zone 3a and the machining head 8 is positioned in alignment with the arm 23 of the first changer element 14.

During the positioning movement of the gantry 5, or beforehand, the selector device 18 is piloted by a signal from an electronic controller to prepare the tool 9 for the new operation. Accordingly, the selector device 18 will pick the specified tool 9 and offer it to the gripper element 24 associated with the end of the arm 23 directed toward the magazine 12.

Next, the gripper element 24 associated with the end of the arm 23 directed toward the machining station 3 takes up the tool 9 from the machining head 8 and the arm will be rotated through 180°. Thus, the tool 9 being replaced can be returned to the magazine 12 whilst the tool 9 selected for the new machining operation is offered to the head 8. The gripper element 24 carrying the change tool 9 now attaches the selfsame tool 9 to the head 8, whilst the selector device 18 takes up the tool 9 just removed from the head and proceeds to return it to the designated horizontal shelf 17.

To advantage, the gantry 5 remains positioned within the first zone 3a both during the machining operations and during replacement of the tool 9.

Clearly, when the gantry 5 is positioned in the second zone 3*b*, it does not need to return to the first zone 3*a* for a tool change, since the change will be performed by the relative element 15 in the second zone 3*b*.

Accordingly, machining operations are speeded up considerably by virtue of the fact that tool change operations are performed by changer elements 14 and 15 serving each of the two zones 3*a* and 3*b*.

A further advantage of the present invention is that it allows an operator to perform manual tasks in either of the zones 3*a* or 3*b* not occupied by the gantry 5. This advantage likewise is achieved by virtue of the fact that the gantry 5 can continue to occupy one only of the two zones 3*a* or 3*b* during tool change operations.

Similarly advantageous is the constructional simplicity of a machine in which the two divisions of a dual zone machining station 3 are served by a single tool magazine 12. This also facilitates the maintenance operations carried out on the single magazine and the relative complement of tools.

What is claimed is:

1. A machine tool, comprising:
    at least one pair of slide ways, set apart one from another and extending parallel with a predominating longitudinal axis;
    a machining station delimited laterally by the slide ways and presenting a first zone and a second zone adjacent one to the other;
    a traveling gantry associated with the pair of slide ways and carrying a machining head positioned above the machining station, capable of movement along the ways in such a way that the machining head can be positioned in the first and second zones;
    a magazine placed alongside at least one of the slide ways and containing a plurality of machining tools attachable to the machining head, comprising a first changer element positioned to coincide with the respective first zone of the station, and a second changer element positioned to coincide with the respective second zone, each capable of movement between a first operating position in which it occupies the magazine for the purpose of selecting at least one of the tools, and a second position in which it occupies the machining station for the purpose of fitting the selected at least one tool to the machining head.

2. A machine tool as in claim 1, wherein the magazine further comprises a chamber, and a selector device capable of movement internally of the chamber so that it can offer one of the plurality of tools to each changer element when in the relative first operating position.

3. A machine tool as in claim 2, wherein the chamber presents a plurality of horizontal and parallel supports, attached to the internal walls of the selfsame chamber and serving to hold the machining tools when not in use.

4. A machine tool as in claim 3, wherein the selector device comprises a substantially vertical column slidable alongside the supports, also a slide traversable vertically along the length of the column and presenting a gripper assembly, capable of movement between a first position of alignment with the horizontal supports, in which one of the machining tools is taken up by the gripper assembly, and a second position of proximity to the first or second changer element in which the one tool is transferred from the gripper assembly to the respective changer element.

5. A machine tool as in claim 2, wherein the selector device comprises a sliding looped belt describing a substantially elliptical path that includes a rectilinear branch passing in close proximity to the first and second changer elements.

6. A machine tool as in claim 5, wherein the belt presents a plurality of carrier portions ordered along the length of the loop and serving to support single ones of the plurality of tools, each carrier portion capable of movement between a first position in which a selected tool is held in alignment with the belt, and a second position, along the rectilinear branch, in which the selected tool is offered to the first or the second changer element.

7. A machine tool as in claim 2, wherein each changer element comprises: a fixed support presenting a first end anchored stably to the magazine and a second end opposite to the first end; also a movable portion pivotably associated with the second end of the fixed support.

8. A machine tool as in claim 2, wherein the traveling gantry comprises:
    two uprights, each presenting a first end slidably associated with one of the ways, and a respective second end opposite from the first end;
    a beam set transversely to the longitudinal axis and presenting two opposite ends anchored respectively to the second ends of the uprights;
    a drive unit by way of which the machining head is associated with the beam in a position facing the machining station, capable of movement along the beam in a direction transverse to the longitudinal axis of the machine in such a way as to position the machining head in close proximity to the first and second changer element when the changer elements are in the respective second position.

9. A machine tool as in claim 1, wherein each changer element comprises: a fixed support presenting a first end anchored stably to the magazine and a second end opposite to the first end; also a movable portion pivotably associated with the second end of the fixed support.

10. A machine tool as in claim 9, wherein the movable portion comprises an arm of which at least one end is equipped with a gripper element serving to hold a machining tool.

11. A machine tool as in claim 10, wherein the arm is rotatable about a substantially vertical axis between a first position corresponding to the first position of the changer element, in which one of the plurality of tools is taken up from the magazine by the gripper element, and a second position corresponding to the second position of the changer element, in which the one tool is offered by the gripper element to the machining head.

12. A machine tool as in claim 10, wherein the traveling gantry comprises:
    two uprights, each presenting a first end slidably associated with one of the ways, and a respective second end opposite from the first end;
    a beam set transversely to the longitudinal axis and presenting two opposite ends anchored respectively to the second ends of the uprights;
    a drive unit by way of which the machining head is associated with the beam in a position facing the machining station, capable of movement along the beam in a direction transverse to the longitudinal axis of the machine in such a way as to position the machining head in close proximity to the first and second changer element when the changer elements are in the respective second position.

13. A machine tool as in claim 9, wherein the movable portion comprises an arm of which the opposite ends are equipped with respective gripper elements, each serving to hold a machining tool.

14. A machine tool as in claim 13, wherein the arm is rotatable about a substantially vertical axis between a first position corresponding to the first position of the changer element, in which one of the plurality of tools is taken up from the magazine by one of the gripper elements, and a second position corresponding to the second position of the changer element, in which the one tool is offered by the one gripper element to the machining head.

15. A machine tool as in claim 13, wherein the traveling gantry comprises:
   two uprights, each presenting a first end slidably associated with one of the ways, and a respective second end opposite from the first end;
   a beam set transversely to the longitudinal axis and presenting two opposite ends anchored respectively to the second ends of the uprights;
   a drive unit by way of which the machining head is associated with the beam in a position facing the machining station, capable of movement along the beam in a direction transverse to the longitudinal axis of the machine in such a way as to position the machining head in close proximity to the first and second changer element when the changer elements are in the respective second position.

16. A machine tool as in claim 9, wherein the traveling gantry comprises:
   two uprights, each presenting a first end slidably associated with one of the ways, and a respective second end opposite from the first end;
   a beam set transversely to the longitudinal axis and presenting two opposite ends anchored respectively to the second ends of the uprights;
   a drive unit by way of which the machining head is associated with the beam in a position facing the machining station, capable of movement along the beam in a direction transverse to the longitudinal axis of the machine in such a way as to position the machining head in close proximity to the first and second changer element when the changer elements are in the respective second position.

17. A machine tool as in claim 1, further comprising two parallel side walls, each located under a relative slide way and delimiting the machining station laterally, wherein the magazine is located externally of the machining station and is associated with one of the side walls.

18. A machine tool as in claim 17, wherein each changer element occupies a respective opening fashioned in the side wall associated with the magazine.

19. A machine tool as in claim 1, wherein the traveling gantry comprises:
   two uprights, each presenting a first end slidably associated with one of the ways, and a respective second end opposite from the first end;
   a beam set transversely to the longitudinal axis and presenting two opposite ends anchored respectively to the second ends of the uprights;
   a drive unit by way of which the machining head is associated with the beam in a position facing the machining station, capable of movement along the beam in a direction transverse to the longitudinal axis of the machine in such a way as to position the machining head in close proximity to the first and second changer element when the changer elements are in the respective second position.

20. A machine tool as in claim 1, comprising a bulkhead positioned between the first and second zones, wherein the gantry is traversable above the bulkhead from one zone to the other.

* * * * *